United States Patent
Booth

(10) Patent No.: US 7,810,370 B1
(45) Date of Patent: Oct. 12, 2010

(54) ACCELEROMETER CALIBRATOR RESONANCE DAMPER AND METHODS

(76) Inventor: Galt B. Booth, 44 Bristol St., Branford, CT (US) 06405

( * ) Notice: Subject to any disclaimer, the term of this patent is extended or adjusted under 35 U.S.C. 154(b) by 655 days.

(21) Appl. No.: 11/670,667

(22) Filed: Feb. 2, 2007

Related U.S. Application Data

(60) Provisional application No. 60/765,275, filed on Feb. 3, 2006.

(51) Int. Cl.
*G01P 21/00* (2006.01)
(52) U.S. Cl. .................................................. 73/1.38
(58) Field of Classification Search .................. None
See application file for complete search history.

(56) References Cited

U.S. PATENT DOCUMENTS 3,120,622 A * 2/1964 Dranetz et al. ............... 310/329
4,542,311 A * 9/1985 Newman et al. ............... 310/13

OTHER PUBLICATIONS

B&K Instruments, Inc. brochure entitled "vibration exciter system V", 1970.*
Booth, Bruel & Kjaer brochure entitled "vibration exciter system M", Mar. 1, 1971.*
Metrology 95 Conference paper entitled "The Nist Super Shaker Project", Oct. 17-19, 1995.*

* cited by examiner

*Primary Examiner*—Robert R Raevis
(74) *Attorney, Agent, or Firm*—Bachman & LaPointe, P.C.

(57) ABSTRACT

A calibrator includes a moving element having a structural member having a mounting feature for mounting the device to be calibrated. The moving element includes first and second coils at first and second ends. A fixed element supports the moving element and includes at least one magnet magnetically cooperating with the first and second coils. In at least one mode of operation, an amplifier is coupled to the first and second coils in parallel.

19 Claims, 2 Drawing Sheets

ACCELEROMETER CALIBRATOR RESONANCE DAMPER AND METHODS

CROSS-REFERENCE TO RELATED APPLICATION

Benefit is claimed of U.S. patent application Ser. No. 60/765,275, filed Feb. 3, 2006, and entitled "Accelerometer Calibrator Resonance Damper and Methods", the disclosure of which is incorporated by reference herein as if set forth at length.

BACKGROUND OF THE INVENTION

The invention relates to accelerometers. More particularly, the invention relates to accelerometer calibrators.

A Super Shaker (FIG. 1) is a dual coil, vibration generator, used for accelerometer calibration, configured to operate in the horizontal direction. A description of the Super Shaker appears in B. F. Payne and G. B. Booth, "The NIST Super Shaker Project," Proc. Metrologie 95, Nimes, France, pp. 296-301, (Oct. 16-19, 1995). The generator has a central longitudinal axis 500. The moving element 20 is held for axial movement relative to a fixed/stationary member by means of a first pair of flexures 22A and a second pair of flexures 22B. The moving element 20 includes a structural member 24 extending from a first (left in the illustration) rim 26A to a second rim 26B. Near the first rim 26A, the structural member 24 carries a first coil 28A. Near the second rim 26B, the structural member carries a second coil 28B. The fixed/stationary member includes first and second magnets 30A and 30B respectively cooperating with the coils 28A and 28B. Each exemplary magnet includes an inner pole 32 and an outer pole 34. Exemplary magnets are formed with an iron core and a permanent magnet stack. Other configurations, including electromagnets, are possible. Conical specimen mounting tables 34A and 34B are placed at the ends of deep central cavities 36A and 36B allows the mounting of accelerometers 40 and calibration devices close to one-another.

The moving element is driven by currents in the coils on the two ends provided by a low distortion audio amplifier, similar to amplifiers commonly used to drive loudspeakers used to reproduce music. In an exemplary coupling, the leads for one of the coils pass along the respective flexures of one flexure pair while the leads for the other pass along the flexures of the other flexure pair. Leads for the accelerometer may similarly pass to the associated accelerometer electronics (not shown). To generate the maximum vibratory force, the coils are connected in series, so that the total vibratory force is the sum of the vibratory forces generated at the two ends. They may also be used one-at-a-time. The primary use of the Super Shaker, for calibration, to date, has been the frequency range 5 Hz to 10,000 Hz, with occasional use to 15,000 Hz. Calibrations are commonly made in either of two generic ways, by Reciprocity, where the magnitude of the mass of a weight/mass 42 is changed, and the calibration calculated from the difference in acceleration for known differences in mass. This may involve a series of specific masses at each of a series of specific frequencies across the calibration range to provide a frequency-dependent calibration (correction) factor. Exemplary frequencies may start at the bottom of the range and increase from one to the next by a given percentage (e.g., 50%).

Alternatively, Interferometry is used, where the mass 42 is replaced by a mirror, on which an axial beam of known frequency is reflected, and the calibration calculated from the interference of the input beam and the reflected beam as measured by a photocell. Specifically, for each of the series of frequencies, the doppler effect is used to measure displacement/velocity/acceleration which is compared to the accelerometer output to provide a frequency-dependent calibration. A reference acceleration may be chosen based upon the accelerometer specification and calibrator performance. For example a 2 g reference acceleration may be sufficiently within the accelerometer envelope to generate a useful signal while not being so high as to cause problems generating the acceleration (e.g., calibrator heating that effects accuracy, etc.). The particular model of acceleration may have a known nominal characteristic relation between acceleration and accelerometer output. The calibration is required to correct for variations particular to the individual accelerometer specimen. An oscillator is used to provide a small voltage oscillating signal at the desired frequency. The amplifier is then adjusted to provide an output current at a level where the accelerometer output corresponds at least approximately to the reference acceleration in view of the nominal characteristic. The measured acceleration is compared to the output to generate the calibration.

BRIEF DESCRIPTION OF THE DRAWINGS

Like reference numbers and designations in the various drawings indicate like elements.

DETAILED DESCRIPTION

Figure 1:
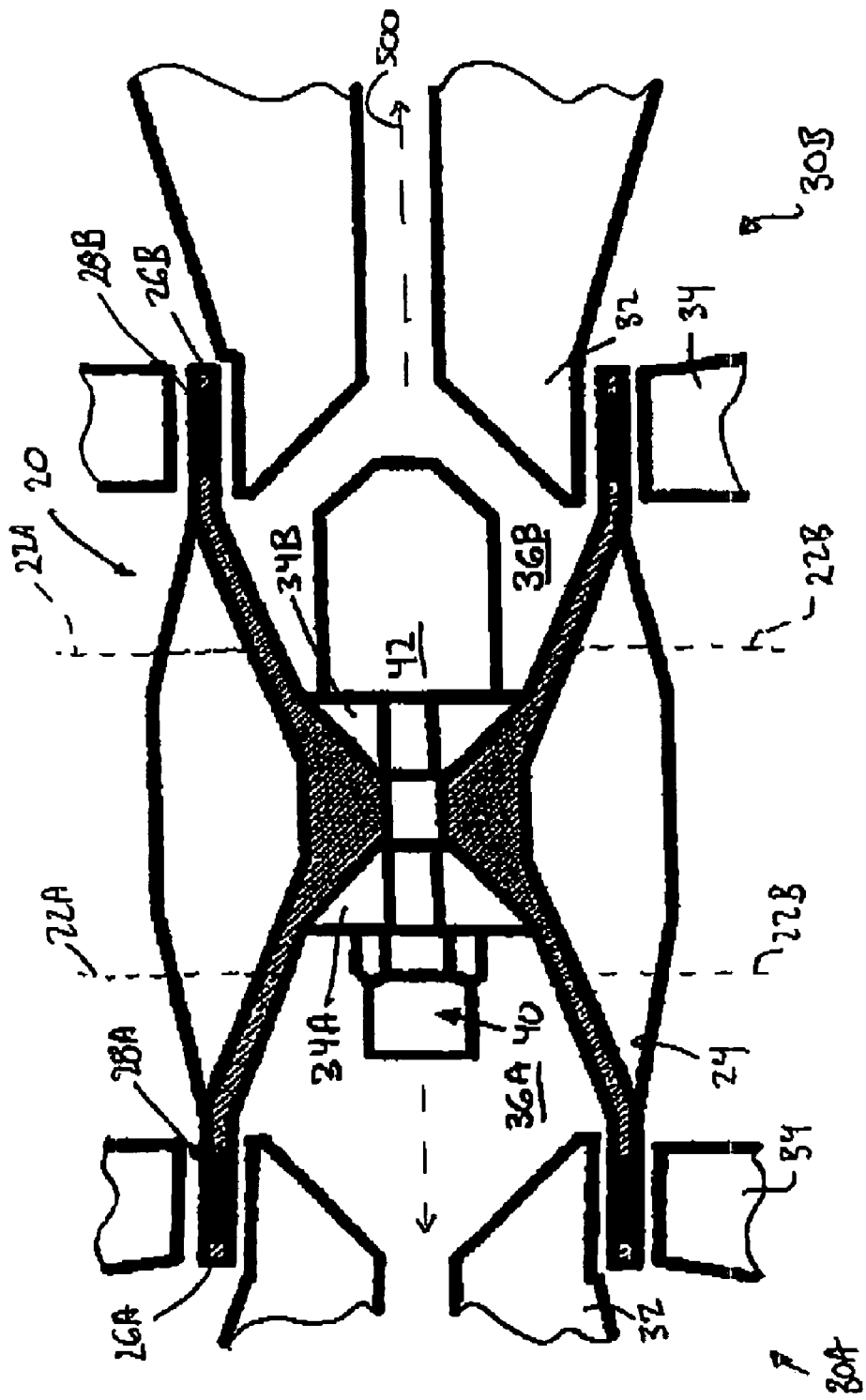
FIG. 1 is a horizontal sectional view of a calibrator moving element (schematically showing flexures in broken line).

The present resonance damper increases the nominal calibration range of the Super Shaker accelerometer calibrator from 15,000 Hz to 30,000 Hz for aluminum moving elements and to over 50,000 Hz for beryllium or beryllium alloy moving elements of the present size (about four inches long). Being considered for the next generation Super Shaker is a beryllium alloy (e.g., about 99% Be, by weight, with alloying elements for machinability) moving element two thirds the size, which would provide calibrations to 75,000 Hz.

With the basic Super Shaker accelerometer calibrator, the calibrations become inaccurate at higher frequencies due to the effects of the major axial resonance of the moving element, where the masses of the two coil regions are connected by the central structure acting as a spring. As the operating frequency gets close to the axial resonance frequency, the motions of the two tables are no longer identical, since the two tables are located at different axial positions on this expanding and contracting spring. When the difference of the motions becomes a significant fraction of the main axial motion, the error in the calculated calibration also becomes significant, and the calibration has too much error to be used.

In an improved accelerometer calibrator, designated Super Shaker 2, having an aluminum moving element structure, and aluminum coils, the axial resonance frequency is about 23,000 Hz, with only a few percent structural damping. In the normal configuration, with the amplifier driving the two coils connected in series, the calibration error becomes significant as the operating frequency approaches 15,000 Hz. Accurate calibrations cannot be made above about 15,000 Hz without changes.

The normal Super Shaker 2 Amplifier has four output terminals, a high and a low, for each of the two coils. Internal switches connect the output of the amplifier to the left coil, the right coil, or the two coils in series. The amplifier is typically mounted in an instrumentation console near the Super Shaker.

A 14-foot long cable having two relatively low impedance twisted pair leads connect the amplifier to the moving element. Operator selection of switching routes the output to the moving element coils. In the past, for operating frequencies up to 10,000 Hz, switching was provided either to the left coil, to the right coil, or to the two coils in series.

At higher frequencies, however, resonance damping may be needed. The present invention provides one or more parallel couplings of the coils in one or more modes of operation to achieve resonance damping and permit higher frequency operation.

Normally, with the coils connected in series, at low frequencies, the two coils of the moving element move together, each in its own magnetic field. The currents in the two coils are the same, and each coil generates the same force, with the sum of the two forces causing the acceleration vibration of the moving element and the devices on the tables. The motions of each of the two coils in their magnetic fields generates a back emf voltage, with the sum of the two voltages, and the drops in the drive cables equal to the output voltage of the amplifier.

For the same case, coils connected in series, as the frequency is raised, approaching the resonance frequency, the motions of the two coils begin to differ, one an amount less than the average motion of the two, and one the same amount more than the average. The difference in the motions of the two coils is the resonance motion. It is this resonance motion that causes the extension and compression of the structural spring of the moving element body, and the much smaller difference in motion of the two tables, the calibration error motion.

Figure 2:
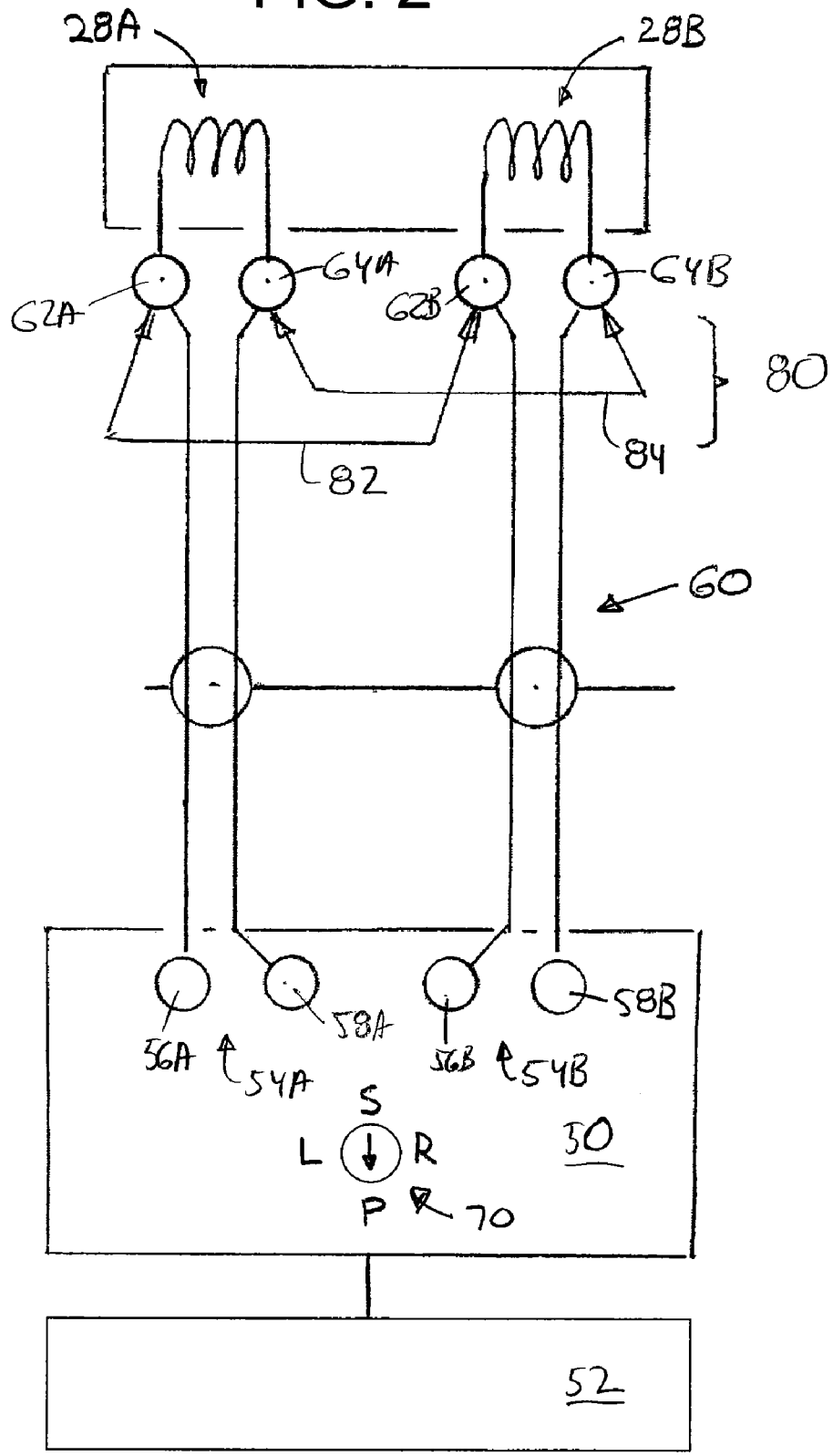
FIG. 2 is a schematic showing calibrator-to-amplifier connections.

A long cable damper is achieved by connecting the amplifier output to drive the two moving element coils in parallel. In one example of this, a basic amplifier having switch positions for energizing the left coil, the right coil, or both coils in series is modified by placing jumpers across its terminals so that, with the switch set to either left or right mode, the coils are coupled in parallel. An alternative involves simply modifying the switching to provide a parallel operation. FIG. 2 shows an exemplary such modified-switching amplifier 50 coupled to an oscillator 52 to receive a signal of a desired frequency. The amplifier 50 includes a first pair of terminals 54A and a second pair of terminals 54B, respectively coupled to the first and second coils 28A and 28B. Each terminal pair 54A and 54B includes a first terminal 56A, 56B and a second terminal 58A, 58B. The terminals are coupled by associated conductors of a cable 60 to terminals 62A, 62B, 64A, and 64B at ends of the associated leads of the associated coils. An exemplary switch 70 has settings for left, right, series, and parallel coil energizing. For this minimum change case, as the is frequency is raised in the parallel mode, approaching the resonance frequency, the motions of the two coils begin to differ, one a smaller amount less than the average motion of the two, and one the same smaller amount more than the average. The difference in the motions is the reduced resonance motion which results in a reduced calibration error motion. The reason for the motion being reduced is that the difference in the motions of the two coils causes a difference in the back emf voltages generated by the two coils, causing a damping current to flow through the loop of the two coils and their cable connections, in a direction to resist the buildup of resonance motion. Results are improved, but not much, because the resistance and inductance of the long cable are too high.

A medium cable damper could be achieved by replacing the 14-foot long drive cable with a much shorter one. However, the amplifier must be nearby, away from the rest of the instrumentation in the instrumentation rack. As expected, the results would be better than the long cable damper but not as good as the short jumper damper to follow.

A short jumper damper 80 comprising a pair of jumpers/conductors 82 and 84 is also shown in FIG. 2. It is connected directly between the terminals of the moving element coils, at the moving element end of the cable, shown with leads having arrowheads, because it would be removed at low frequencies. It would be designed for low inductive and resistive drop, typically of many twisted pairs of smaller wire, because it would not have to carry the load currents. For example, each of the conductors 82 and 84 could include one wire of each twisted pair interwrapped with an associated wire of the other conductor. An exemplary number of twisted pairs is 4-6.

Typically a short damper for a Super Shaker having an aluminum moving element might be made of eight strands of #16 wire, each 12-inches long, configured into four twisted pairs, connected between the moving element ends of the drive cable. The smaller wires make lower inductance twisted pairs, further reduced by the parallel connection. The reduced length and reduced resistance and inductance, increase the damping currents, almost eliminating the resonance motion buildup, and reducing the calibration error to a very small value. Calibration is possible to at least 30,000 Hz.

Short jumper damper for beryllium moving elements: Beryllium is less dense than aluminum and about four times as stiff, but very much more difficult and dangerous to fabricate, so beryllium moving elements cost more. The resonance frequency of a similar geometry beryllium or beryllium alloy moving element approaches 50,000 Hz. A short jumper damper with more, finer, strands is required to damp the resonance of such a moving element, with changes in the moving element as well.

One or more embodiments of the present invention have been described. Nevertheless, it will be understood that various modifications may be made without departing from the spirit and scope of the invention.

I claim:

1. A calibrator comprising:
   a moving element having:
      a structural member having a mounting feature for mounting a device to be calibrated;
      a first coil supported by the structural member and having first and second terminals; and
      a second coil supported by the structural member and having first and second terminals;
   a fixed element supporting the moving element and including:
      at least one magnet magnetically cooperating with the first and second coils; and an amplifier having:
      a first terminal pair having:
         a first terminal electrically connected to a first terminal of the first coil; and
         a second terminal electrically connected to a second terminal of the first coil;
      a second terminal pair having:
         a first terminal electrically connected to a first terminal of the second coil; and
         a second terminal electrically connected to a second terminal of the second coil;
   wherein:
      the first and second coils are coupled in parallel.

2. The calibrator of claim 1 wherein:
   the at least one magnet comprises:
      first and second permanent magnet assemblies respectively coupled to the first and second coils.

3. The calibrator of claim 1 wherein:
the first and second coils comprise aluminum; and
the structural member comprises a beryllium alloy.

4. The calibrator of claim 1 wherein:
the first and second coils are coupled in parallel via a switch at the amplifier.

5. The calibrator of claim 4 wherein:
the first and second coils are coupled in parallel via a jumper.

6. The calibrator of claim 1 wherein:
the first and second coils are coupled in parallel via a jumper.

7. The calibrator of claim 6 wherein:
the first and second coils each have a first terminal and a second terminal; and
the jumper comprises a plurality of twisted pairs, in each twisted pair a first conductor coupling the first terminals of the first and second coils and a the other conductor coupling the second terminals of the first and second coils.

8. The calibrator of claim 1 in combination with an accelerometer mounted to the moving element.

9. A method for operating the calibrator of claim 1, the method comprising:
mounting an accelerometer to the moving element;
energizing the coils in parallel; and
measuring an output of the accelerometer.

10. The method of claim 9 wherein:
the energizing and measuring are performed for a plurality of driving frequencies.

11. The method of claim 10 wherein:
for each of the driving frequencies, the energizing and measuring are performed for a plurality of different reference masses mounted to the moving element.

12. The method of claim 10 wherein:
the driving frequencies are in a first range; and
for a plurality of driving frequencies in a second range, lower than the first range, the energizing is performed in a non-parallel mode.

13. A calibrator comprising:
a moving element having:
    a structural member having a mounting feature for mounting a device to be calibrated;
    a first coil supported by the structural member and having first and second terminals; and
    a second coil supported by the structural member and having first and second terminals;
a fixed element supporting the moving element and including:
    at least one magnet magnetically cooperating with the first and second coils;
an amplifier; and
means for damping resonant behavior of the structural member, the means comprising means for parallel coupling of the first and second coils to the amplifier.

14. The calibrator of claim 13 wherein:
the means comprises a switch providing said parallel coupling in a parallel mode and also providing at least one non-parallel mode.

15. A calibrator comprising:
a moving element having:
    a structural member having a mounting feature for mounting a device to be calibrated;
    a first coil supported by the structural member and having first and second terminals; and
    a second coil supported by the structural member and having first and second terminals;
a fixed element supporting the moving element and including:
    at least one magnet magnetically cooperating with the first and second coils;
an amplifier; and
means for damping resonant behavior of the structural member, the means comprising a jumper directly connecting terminals of the first and second coils.

16. A method for calibrating an accelerometer, the method comprising:
mounting the accelerometer to a moving element of a calibrator;
for each of a plurality of frequencies in a first frequency range:
    driving first and second coils of the calibrator in parallel;
    measuring an output of the accelerometer; and
    determining a calibration of the output.

17. The method of claim 16 further comprising:
for each of the plurality of frequencies in the first frequency range:
    at least one of:
        measuring an acceleration of the moving element by interferometry so that the determining is done by comparison of the measured output and the measured acceleration; and
        changing a reference mass so that the determining is done by reciprocity.

18. The method of claim 16 further comprising:
for each of a plurality of frequencies in a second frequency range, below the first frequency range:
    driving only one of the first and second coils of the calibrator or driving both in series;
    measuring an output of the accelerometer; and
    determining a calibration of the output.

19. The method of claim 18 wherein:
the first frequency range includes a portion above 20,000 Hz; and
the second frequency range includes a portion below 10,000 Hz.

\* \* \* \* \*